United States Patent
Claesson et al.

(10) Patent No.: US 7,234,379 B2
(45) Date of Patent: Jun. 26, 2007

(54) DEVICE AND A METHOD FOR PREVENTING OR REDUCING VIBRATIONS IN A CUTTING TOOL

(76) Inventors: Ingvar Claesson, Hallerstensvagen 59, 140 10 Dalby (SE); Lars Hakansson, Norra Hagtornsgatan 10, 256 61 Helsingborg (SE); Thomas Lago, 70 Himalaya Ct., Alpine, UT (US) 84004; Rolf Zimmergen, Vastergatan 20, 330 12 Forsheda (SE); Göran Hållstedt, Dannösvägen 6, 330 12 Forsheda (SE)

( * ) Notice: Subject to any disclaimer, the term of this patent is extended or adjusted under 35 U.S.C. 154(b) by 71 days.

(21) Appl. No.: 11/168,653

(22) Filed: Jun. 28, 2005

(65) Prior Publication Data

US 2006/0291973 A1    Dec. 28, 2006

(51) Int. Cl.
*B23B 27/00* (2006.01)
*B23B 29/00* (2006.01)
*B23Q 17/12* (2006.01)
*B23Q 11/00* (2006.01)

(52) U.S. Cl. ............... 82/1.11; 82/158; 82/904; 409/141; 408/143; 188/380; 267/137

(58) Field of Classification Search ............... 82/1.11, 82/1.5, 12, 11.3, 1.4, 1.2, 158, 160, 161, 904, 82/173, 163; 409/131, 141, 234, 232; 408/1 R, 408/143; 188/378–380; 267/137; 310/328, 310/326, 316.01, 323.01, 323.18; 318/128
See application file for complete search history.

(56) References Cited

U.S. PATENT DOCUMENTS

| | | | | |
|---|---|---|---|---|
| 3,642,378 A | * | 2/1972 | Hahn et al. ............ | 408/143 |
| 4,553,884 A | * | 11/1985 | Fitzgerald et al. ........ | 408/143 |
| 5,170,103 A | * | 12/1992 | Rouch et al. ............ | 318/128 |
| 6,661,157 B1 | * | 12/2003 | Lundblad ................ | 310/328 |
| 6,925,915 B1 | * | 8/2005 | Claesson et al. .......... | 82/133 |
| 2002/0036091 A1 | * | 3/2002 | Claesson et al. ......... | 173/162.1 |
| 2002/0083805 A1 | * | 7/2002 | Lundblad ................ | 82/1.11 |

FOREIGN PATENT DOCUMENTS

JP        6-31508 A    *   2/1994

\* cited by examiner

*Primary Examiner*—Erica Cadugan
(74) *Attorney, Agent, or Firm*—Rolf Fasth; Fasth Law Offices

(57) ABSTRACT

An arrangement for reducing vibrations in a tool holder (4) with a cutting tool (3) and has a vibration sensor on the tool holder (4) that is connected to a guide unit (11). The tool holder (4) has further two piezo-electric actuators 14 and 15.

Under the influence of the vibration sensor (9), the guide unit (11) provides an electric alternating current that is actively guided over time so that the actuators movably affect the tool holder (4) to reduce the vibrations in this. To also be able to dampen transients in the tool holder (4) this is movably connected with a passive dampening arrangement that is independent of the guide unit (11) and that is based on the principle of a springing (8) suspended mass (7). The invention also relates to a method for reducing vibrations. The vibrations in the tool holder are sensed and a corresponding signal is provided to a guide unit that over time provides actively guided signals to the actuators. The tool holder is also passively influenced by a dampening arrangement that is independent of the guide unit.

9 Claims, 1 Drawing Sheet

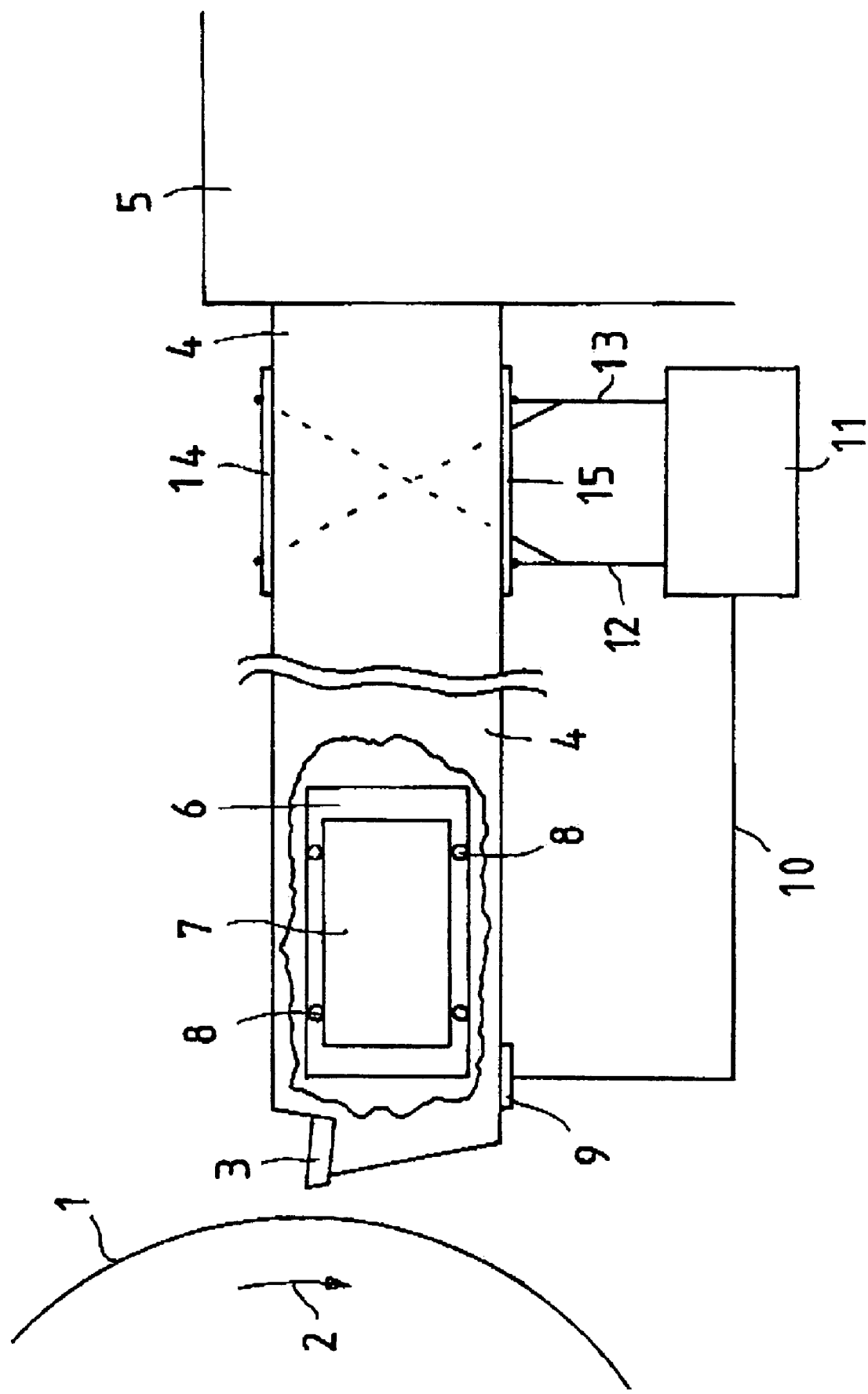

DEVICE AND A METHOD FOR PREVENTING OR REDUCING VIBRATIONS IN A CUTTING TOOL

TECHNICAL FIELD

The present invention relates to an arrangement for the prevention or at least the reduction of vibrations in a cutting tool; such as a lathe, that is supported by a tool holder. The arrangement includes a vibration sensor for the sensing of vibrations of the tool or the tool holder, a guide unit that, under the influence of signals from the guide unit, is arranged to actively affect the tool and/or its holder to prevent or reduce vibrations in the tool or holder.

The invention also relates to a method of preventing or at least reducing vibrations in a cutting tool that is supported by the tool holder. The method includes the steps of sensing the vibrations, affecting the tool and/or its tool holder by a time variable force that depending on the sensed vibrations is guided to prevent or reduce the vibrations.

PRIOR ART

For example, SE-C2-514 525 discloses an arrangement of the type described in the introduction. This arrangement has a cutting tool that is arranged on a tool holder that in turn is attached to a tool fixture. The tool holder has a vibration sensor that is connected to a regulation system that has one or many outputs that are connected to actuators of piezo-electric types. These actuators are arranged on the tool holder to provide a bending momentum that is time controlled in such a way that elimination or at least a reduction of the vibrations of the tool holder is accomplished.

Similar constructions are also described in SE-C2-517 878, SE-C2 517 790 and JP A 6380401.

The above described arrangements are active arrangements for reducing or eliminating vibrations.

It is also known to provide passive dampening arrangements for dampening vibrations or tools and their holder. An example of such a passive arrangement is described in U.S. Pat. No. 5,810,828. Dampening arrangements according to the above mentioned American patent application has an internal cavity in the tool holder in which a mass is movably suspended via a spring system. The dampening arrangement works in a way so that the spring system is adjusted so that the dampening mass gets into a natural resonance at the vibration frequency that is desirable to reduce. The dampening arrangement only works in an axial direction so that it has only very limited areas of use.

The arrangement according to the American patent application has a guide arrangement with which the springing characteristics in the springing system can be varied so that the resonance frequency can be changed.

The above described active arrangements for vibration reduction can function well in many situations but have deficiencies because the guide systems are not fast enough to be able to handle transients that occur when the tool is engaged in a work piece and also transients that occur later in the cutting process.

A passive dampening arrangement on the other hand has a very narrow reduction area and can, in practice, hardly completely dampen or reduce vibrations even though the theory says it would be possible.

Problem Description

The present invention has the object of providing the arrangement described in the introduction so that this in a good way can also handle such transients that occur in connection with the tool engaging a work piece but also transients that occur later during the cutting process. The invention also has the object of shaping the arrangement so that it continually and substantially reduces vibrations in a tool and its holder at many vibration frequencies.

The invention has further the object of providing the above mentioned method so that this provides good dampening of the transients that can occur when the tool initially engages a work piece but also transients that occur later during the cutting process. The invention has further the object of providing continually good reduction of vibrations in the tool and its holder at many vibration frequencies.

Problem Solution

The fundamentals of the object of the invention are accomplished regarding the arrangement if this is characterized so that the tool and/or its holder can in addition to the actuator/actuators be affected by a passive dampening arrangement that is independent of the signals from the guide unit.

The fundamentals of the object of the invention are accomplished regarding the method if this is characterized so that the tool and/or its tool holder in addition to the controlled force are also affected by a passive dampening.

DRAWING

The invention is now described in more detail with reference to the appended drawing which shows a tool supported by a tool holder for external lathing wherein the tool holder is partly opened for showing internal components.

PREFERRED EMBODIMENT

The invention is described below in an embodiment for external lathing but can with at least the same advantages be used for internal lathing and for cutting processes in general.

In the FIGURE the reference numeral 1 refers to a work piece that rotates according to the arrow 2. A cutting tool 3 is attached in a tool holder 4 which in turn is attached to a tool fixture 5.

The invention is a combination of active vibration reduction and a passive vibration dampening and the passive vibration dampening is particularly effective for dampening of vibrations caused by transients during the cutting or during the initiation of such. The active vibration reduction is particularly advantageous when it comes to reducing or eliminating continuous vibrations in the tool 3 and its holder 4. The active vibration reduction can also reduce vibration at many different frequencies. The passive dampening also has the advantage of being able to dampen such vibrations that depend on gaps in the attachment of the tool holder 4 to the tool fixture 5 or the attachment of the tool fixture of the lathe.

The passive dampening of the tool 3 and its holder 4 means that the holder 4 has at the end closest to the tool 3 an internal cavity 6 in which a body 7 is movably arranged with a spring arrangement. In the embodiment shown, the spring arrangement has rings 8 made of elastic material. The body 7 is internally suspended in the cavity 6. The cavity 6 may be filled with a viscous dampening fluid.

By adjusting the springing characteristics of the spring arrangement, in a spring constant and possibly pre-tension in a linear system, relative to the mass of the body 7 a frequency area can be found where the passive dampening is effective. In general the "harder" the spring is relative to the size of the mass the higher the resonance—(dampening) frequency. In reverse, the larger the mass relative to the "hardness" of the spring the lower the resonance frequency is. In the embodiment shown, the body 7 is movable both axially and radially i.e. both lengthwise of the tool holder 4 and across this length direction. This means that the dampening that is accomplished is independent of the direction and it can have different resonance frequencies in different directions. In the embodiment shown the spring can be expected to be axially "weaker" than radially so that the axial resonance frequency is likely lower than the radial. With a different cross section of the rings 8, for example a larger diameter than the cross section, a less "stiff" radial springing can be accomplished and thus reduce the resonance frequency in this direction.

The active vibration reduction includes a movement or vibration sensor, such as an accelerometer 9 that is placed at the outer free end of the tool holder 4 that is as close to the tool 3 as possible. The vibration sensor 9 is via a connector 10 connected to the guide unit 11, that is dependent upon vibrations sensed by the vibration sensor 9, that provides an alternating current in both wires 12 and 13.

In a practical situation the axial vibration can often be ignored while the radial and the transverse must be reduced. During external lathing the main direction of the vibration is direction in a vertical direction in the FIGURE, i.e. that tool holder 4 is bent up and down like the beam attached at the right end. Vibration in the feed direction that is perpendicular to the plane of the paper in the FIGURE can also exist.

During internal lathing the tool holder 4 often has a circular or oval cross section. In this alternative, the vibrations are mainly directed along the movement direction of the work piece in the contact area between the work piece and the cutting tool 3. The vibrations that are directed along the radius of the rotating work piece through the contact area between the work piece and the cutting tool 3 also exist.

This means that a resulting vibration direction is formed that can be said to be turned a certain number of degrees around the length direction of the tool holder 4. In practice this is often about 30 degrees from the direction of the movement of the work piece in the contact area. This number value can vary substantially and depend among other things on the current cutting parameters and the cross sectional shape of the tool holder 4.

During external lathing an analogous situation is obtained if the vibrations in the feed direction are taking into account. To reduce these bending movements in the tool holder 4 actuators 14 and 15 are placed on the upper and lower side of the tool holder. These are movably joined with the tool holder 4. The actuators may be completely or partly counter sunk inside the outer surface of the tool holder or be imbedded in the material. The actuators, which preferably are of a piezo electric type (any type of a suitable piezoelectric material can be used) have the characteristic that when they are exposed to a tension in one direction they are lengthwise expanded and when opposite polarity is used the opposite phenomenon occurs that is the actuators are contracted in the length direction. In this way it is assumed that the length direction substantially corresponds to the length direction of the tool holder 4. An actuator of another type can also be used such as actuators that are based on using magneto-restrictive materials i.e. materials that undergo a form change when magnetized.

As an alternative to placing the actuators on the upper and underside of the tool holder 4, the placing of the actuators can be adapted to the situation when the vibrations in the feeding direction are also considered (external lathing) and in the direction of the radius (internal lathing). In this case the placing of the actuators is slightly turned about the length direction of the tool holder 4 away from the straight up and straight down positions.

The above means that if the upper actuator 14 is extended while the lower actuator 15 is shortened this will via the connection between both actuators and the tool holder 4 apply a bending momentum on this that is biased to bend the tool holder 4 in a downward direction.

The FIGURE shows that both the wires 12 and 13 are directly connected to the lower actuator 15 while the wires are crossed before the connection to the upper actuator 14 so that the opposite movement of direction is achieved.

The guide system 11 is designed in such a way that based on the signals from the vibrator sensor 9 to the wires 12 and 13 an alternating current is provided that is time guided in such a way that it via both the actuators 14 and 15 provides movements in the tool holder 4. These movements are arranged to reduce and possibly completely eliminate or dampen the vibration movements in the tool holder as much as possible.

The above described actuators 14 and 15 are of a piezoelectric type which means that their function is reversible. In other words, a forced form change of such an actuator means that an electric voltage over the connection points is provided. If this voltage is permitted to drive a current through a resistor the actuator will function as a passive dampener.

This phenomenon can be used according to the invention by, for example, loading both the actuators 14 and 15 during the initiation of the cutting process with a resistor. As the cutting process proceeds the resistors are gradually disconnected and are replaced by the guide system 11. A certain amount of resistance may be applied all the time though assuming it is not too small which would mean it consumes the majority of the effect of the added guide signal. Within the scope of the invention is the concept of using the piezo-electric dampening elements in addition to both the actuators 14 and 15 that in principle are analogous to the actuators 14 and 15 but that are loaded with a possibly adjustable resistor.

To make the active vibration reduction as effective as possible both the actuators 14 and 15 are placed in the areas of the surface of the tool holder 4 where the extension and the compression in the material of the tool holder are at a maximum. As mentioned above, they are completely or partially counter sunk inside the outer surface of the tool holder or arranged in a cavity of this. A mounting outside the tool holder can be considered. Further, the length direction of both actuators is arranged along the extension direction and the compression direction of the surface layer of the tool holder 4.

The invention claimed is:

1. The arrangement is for preventing or at least reducing vibrations in a cutting tool that is supported by a tool holder, the arrangement comprising:

a vibration sensor for sensing vibrations of the tool or the tool holder, a guide unit to which an actuator is connectable, that under the influence of signals from the guide unit is arranged to actively affect the tool and/or the tool holder to prevent or at least reduce vibration;

the tool and/or the tool holder being affectable by the actuator; and a passive dampening arrangement in operative engagement with the tool and/or the tool holder and being independent of signals from the guide unit.

2. The arrangement according to claim 1 wherein the dampening arrangement is arranged in or on the tool holder.

3. The arrangement according to claim 1 wherein the dampening arrangement includes a cavity in the tool holder that has a spring arrangement engaging a biased suspended body that is surrounded by a viscous fluid.

4. The arrangement according to claim 3 wherein the dampening arrangement is positioned in the tool holder closest to an end portion of the cutting tool.

5. The arrangement according to claim 1 wherein the dampening arrangement includes a piezo-electric element that is movably joined with the tool holder so that the piezo-electric element during vibration generating changes form and is arranged to provide a current and be under a resistor load.

6. A method for preventing or at least reducing vibrations in a cutting tool, comprising:
 providing a cutting tool that is supported by a tool holder and having a vibration sensor for sensing vibrations of the cutting tool or the tool holder, a guide unit to which at an actuator is connectable;
 the guide unit sending signals to the actuator to actively affect the tool and/or the tool holder to prevent or at least reduce vibration;
 the actuator reducing vibrations in the tool and/or the tool holder; and
 a passive dampening arrangement reducing vibrations in the tool and/or the tool holder, the reduction of vibrations provided by the dampening arrangement being independent of signals from the guide unit.

7. The method according to claim 6 wherein the method further comprises arranging the passive dampening arrangement in or on the tool holder.

8. The method according to claim 6 wherein the method further comprises defining a cavity in the tool holder and a spring arrangement engaging a biased suspended body that is surrounded by a viscous fluid.

9. The method according to claim 6 wherein the method further comprises providing the dampening arrangement with a piezoelectric element that is movably joined with the tool holder so that the piezoelectric element changes form during generation of vibrations of the tool holder.

* * * * *